US008259208B2

(12) United States Patent
Ciurea et al.

(10) Patent No.: US 8,259,208 B2
(45) Date of Patent: Sep. 4, 2012

(54) METHOD AND APPARATUS FOR PERFORMING TOUCH-BASED ADJUSTMENTS WITHIN IMAGING DEVICES

(75) Inventors: Florian Ciurea, San Jose, CA (US); Alexander Berestov, San Jose, CA (US); Chuen-Chien Lee, Pleasanton, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 519 days.

(21) Appl. No.: 12/103,501

(22) Filed: Apr. 15, 2008

(65) Prior Publication Data

US 2009/0256947 A1 Oct. 15, 2009

(51) Int. Cl.
*H04N 5/222* (2006.01)
*G06F 3/041* (2006.01)

(52) U.S. Cl. .................................. 348/333.02; 345/173
(58) Field of Classification Search ............ 348/333.02, 348/333.05, 333.11, 333.12, 14.07; 345/173
See application file for complete search history.

(56) References Cited

U.S. PATENT DOCUMENTS

| | | | |
|---|---|---|---|
| 6,115,482 A * | 9/2000 | Sears et al. ........... | 382/114 |
| 6,154,210 A * | 11/2000 | Anderson ........... | 715/840 |
| 6,317,141 B1 | 11/2001 | Pavley et al. | |
| 6,704,467 B2 | 3/2004 | Uchida | |
| 6,919,927 B1 * | 7/2005 | Hyodo ........... | 348/333.02 |
| 7,035,462 B2 * | 4/2006 | White et al. ........... | 382/167 |
| 7,110,040 B1 * | 9/2006 | Misawa ........... | 348/373 |
| 7,248,294 B2 * | 7/2007 | Slatter ........... | 348/240.99 |
| 7,649,562 B2 * | 1/2010 | Misawa et al. ........... | 348/333.01 |
| 2007/0035616 A1 * | 2/2007 | Lee et al. ........... | 348/14.16 |
| 2007/0041029 A1 | 2/2007 | Yoo | |
| 2008/0239133 A1 * | 10/2008 | Cazier et al. ........... | 348/333.05 |
| 2009/0146961 A1 * | 6/2009 | Cheung et al. ........... | 345/172 |

FOREIGN PATENT DOCUMENTS

| | | |
|---|---|---|
| CN | 1603968 A | 4/2005 |
| KR | 20030095583 A | 12/2003 |
| TW | 257029 B | 6/2006 |

OTHER PUBLICATIONS

DigitalCamerainfo.com "HP Introduces R837 with New IN-Camera Editing", Mar. 8, 2007, <http://www.digitalcamerainfo.com/content/HP-Introduces-R387-with-New-In-Camera-Editing.htm>. Samsung "L74 view", available at <http://www.samsungcamera.com/product/pro_view.asp?pro1_uid=2816&cat_uid=10>, accessed Dec. 25, 2007.
Chinese Patent Office, office action issued on Mar. 3, 2011 for CN Application 200910133671.4, counterpart to U.S. Appl. No. 12/103,501, translation (pp. 1/9 through 9/9) with claims examined (pp. 25-29), pp. 1-17.

* cited by examiner

*Primary Examiner* — Trung Diep
(74) *Attorney, Agent, or Firm* — John P. O'Banion

(57) ABSTRACT

A camera and method which selectively applies image content adjustments to elements contained in the image material. By way of example, the method involves registration of user touch screen input and determination of the arbitrary extent of a specific element in the captured image material at the location at which touch input was registered. Once selected, the element can be highlighted on the display, and additional user input may be optionally input to control what type of adjustment is to be applied. Then the element within the captured image material is processed to apply automatic, or user-selected, adjustments to the content of said element in relation to the remainder of the captured image. The adjustments to the image element may comprise any conventional forms of image editing, such as saturation, white balance, exposure, sizing, noise reduction, sharpening, blurring, deleting and so forth.

20 Claims, 3 Drawing Sheets

User touches area to be selected

METHOD AND APPARATUS FOR PERFORMING TOUCH-BASED ADJUSTMENTS WITHIN IMAGING DEVICES

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to cameras and media processing, and more particularly to user interaction with captured image material.

2. Description of Related Art

Digital cameras and camcorders often utilize a touch-screen display to facilitate menu traversal and selection. In digital camera and camcorder applications the display portion of the touch screen is itself generally utilized for previewing the captured scene during or after playback of the recorded material. In these devices when the device enters a menu mode the user can select one or more parameters for changing according to their desires. Some of the current touch screen devices further allow the user to perform scrolling or magnification based on inputs to the touch screen.

The ability to change aspects of the captured images typically involve changing aspects of the entire image such as exposure and color. Some devices provide features such as automatic red-eye elimination which detect and eliminated or reduce the problem. Other devices may allow the user to move a selection region over an area whose intensity or color is to be changed. However, in each case the user is provided with limited control of modification and enhancement of image aspects as viewed on the display associated with the touch screen.

Accordingly, there is a need to provide user-friendly touch input controls for digital cameras and camcorders. The present invention fulfills that need as well as others.

BRIEF SUMMARY OF THE INVENTION

A method and apparatus are described for utilizing the interactivity of the touch screen display within an imaging device (e.g., camera and/or camcorder) for selectively applying image adjustments to elements within the captured material, such as in response to a single touch screen contact from the user. For the sake of simplicity, the term "camera" will be utilized herein to denote any device configured for capturing still and/or video sequences. According to the inventive method, the user can select elements within the scene using the touch screen display either during material capture (still images or video) or during playback of the material on the display. In a preferred mode of the invention, selection input from the user is registered in response to aspects or elements of the scene which have been detected. Selection of one or several elements within the scene is performed by the user in response to touching within the area of the element as displayed on the touch receptive display screen. In response to the selection process, one or more associated elements shown on the display are highlighted and the appropriate adjustment is performed by image processing within the camera device.

In at least one implementation of the invention, the type of touch screen contact (e.g., duration, direction, pattern and so forth) subsequent to the initial contact determines the action to be performed. In one preferred implementation the duration (persistence) of touch screen contact determines the scope of the selection and/or the action to be performed on the selected image portion. By way of example, as the user retains selection contact with the display screen (finger pressing the touch screen with sufficient force to be registered) a selection refinement is performed, such as by enlarging the selection, preferably with corresponding highlighting, until user touch contact is discontinued. To understand this refinement of selection (segmentation) consider an example of "nested" objects within a captured image of a room containing a desk upon which are shelves containing numerous elements, including a baseball on a display stand. User contact is made on the touch screen at the position of the baseball, wherein the baseball is selected first, as user contact persists then the baseball and stand are selected, and as contact persists the shelf upon which they are positioned is selected, and as contact persists the desk is selected.

The following terms are generally described in relation to the specification, but are not to be interpreted toward constraining specific recitations of the specification.

The term "touch screen" is considered herein to refer to any means of sensing the position(s) of user contact or proximity with a display screen. It will be noted that proximity sensing, as found on certain newer non-contact touch screens, provide functionality equivalent to touch screen sensing as described herein, and sense user input within a sufficient proximity of the touch screen, such as within one inch or less. For the sake of simplicity of description, terms relating to contact-based touch screen are adopted herein although each instance of such description applies equally in regards to proximity-based touch screens.

The term "adjustment" is generally utilized herein for describing a modification and/or enhancement of the image content associated with the selected object, and/or adjacent image content. The terms "modification" and "enhancement" are also utilized herein, although these terms may be considered as substantially synonymous.

The term "element" describes regular objects as captured in the image material seen on the display screen, and are also referred to herein as "objects". It should be appreciated that these objects are manifested as portions of the image having an arbitrary boundary circumscribing the peripheral spatial extent of the element (object). The term object, or element, is thus generally used in the plain meaning of the word, wherein cars, planes, trains, people, animals, flowers, trees, electronic books, walkmans, computers, televisions, or any other material item shown on the display for the captured image can be selected and its corresponding image material adjusted according to the invention.

The invention is amenable to being embodied in a number of ways, including but not limited to the following descriptions.

One embodiment of the invention is a method of selectively applying adjustments to elements contained within image material captured by a camera (e.g., still image or video sequence) having touch screen input, comprising: (a) registration of user touch screen input at a location on a display screen at which a specific element in the captured image material is displayed; (b) selecting a specific element of the captured image in response to registration of user touch screen input, wherein the specific element can have any arbitrary shape; and (c) processing the image of the specific element to apply adjustments (e.g., sizing, brightness, contrast, saturation, white balance, noise reduction, sharpening, blurring, deleting (removing and filling), and so forth) to the content of the element in relation to the remainder of the captured image.

In one mode of the inventive method once the image is captured, and prior to user touch screen selection of a part of the image, the programming automatically begins ascertaining boundaries for each of the multiple elements contained within the captured image. In this way the amount of processing necessary for associating the user touch input with an object on the display screen can be significantly reduced, wherein upon user touch screen input one of these multiple elements can be quickly selected for performing an image adjustment, or for highlighting the element in preparation for image adjustment.

In one mode of the invention, the determination of which image adjustments are to be made are automatically ascertained in response to characterizing the image aspects (e.g., brightness, contrast, color balance, object size, background color, and so forth) of the specific object, and comparing that information against a set of standards or benchmarks (e.g., heuristics) from which a determination of a change and the extent of that change is generated. The example shown in FIG. 3A-3D (described later) illustrates a situation in which the size of the element and its stark contrast to its surroundings would indicate an element having a high probability that the user is selecting it because it is unwanted and should be deleted from the image.

In one mode of the invention, user touch screen contact is registered for refining object selection shown on the display.

In another mode, deciding which image adjustments are to be made is ascertained in response to additional touch screen inputs by the user (e.g., finger-moving gestures, or less preferably other inputs) after selection of the specific element to control how that element is edited within the captured image material. In addition, the determination can be performed automatically with a selected level of interaction or acknowledgement from the user. In one mode of the invention, the programming determines a set of possible adjustments which seem likely from the user standpoint, (e.g., given for user selection and organized with most-likely given highest priority on down through lower levels of likelihood) from which the user can select the adjustment.

In at least one implementation of the invention, additional material is collected for use in adjusting the captured image material, and/or the selected element within that image material. In one mode images are captured at a higher resolution than the storage resolution (e.g., typically set by the user) wherein the results of image editing are then down converted, thereby providing superior image results than would be obtained by editing the image at the target storage resolution. High resolution editing comprises: (a) capturing and applying adjustments to the image material at a first image resolution; and (b) storing the image, after the completion of image adjustment processing, at a second image resolution which is equal to or less than the first image resolution; wherein the second image resolution is preferably user selectable (typically user can select resolution of captured images, in this case this becomes the resolution at which they are stored).

Another augmented information mode captures additional images displaced in space and/or time, and comprises: (a) capturing additional image material which is temporally, or spatially separate from the capture of the main image material (i.e., captured in response to electronic equivalent of 'shutter' release); and (b) applying adjustments to the image material, or more preferably objects therein, in response to the additional image material. Preferably, the process includes storing the image material after editing (adjusting) without the associated additional image material.

One embodiment of the invention is a method of selectively applying adjustments to elements contained within image material captured by a camera having touch screen input, comprising: (a) capturing image material comprising a still image or video sequence; (b) registration of user touch screen input at a location on a display screen at which a specific element in the captured image material is displayed; (c) selecting a specific element of the captured image in response to registration of user touch screen input, wherein the specific element can have any arbitrary shape; (d) generating a highlight surrounding the specific element to indicated the selection of the specific element; (e) controlling the application of adjustments to the specific element of the captured image material in response to registration of additional touch screen input in the form of finger-moving gestures; and (f) processing the image of the specific element to apply adjustments to the content of the element in relation to the remainder of the captured image.

One embodiment of the invention is an apparatus (camera), comprising: (a) an optical imager (e.g., CMOS, CCD, and so forth) configured for capturing image material; (b) an optical display for visually displaying captured image material; (c) a touch screen coupled to the optical display for registering the position of user contact upon the display of the captured image material; (d) a computer coupled to the optical imager, the optical display and the touch screen for capturing and displaying image content and selectively applying adjustments to elements contained within the image material; and (e) programming executable on the computer for, (e)(i) registration of user touch screen input at a location on a display screen at which a specific element in the captured image material is displayed, (e)(ii) selecting a specific element of the captured image in response to registration of user touch screen input, wherein the specific element can have any arbitrary shape, and (e)(iii) processing the image of the specific element to apply adjustments to the content of the element in relation to the remainder of the captured image.

One embodiment of the invention is a computer-readable media containing a computer program executable on a computer within a camera configured with a display and associated touch screen, wherein said camera is configured for capturing and displaying image content and selectively applying image content adjustments to elements contained within the image material, comprising: (a) registration of user touch screen input at a location on a display screen at which a specific element in the captured image material is displayed; (b) selecting a specific element of the captured image in response to registration of user touch screen input, wherein the specific element can have any arbitrary shape; and (c) processing the image of the specific element to apply adjustments to the content of the element in relation to the remainder of the captured image.

The present invention provides a number of beneficial aspects which can be implemented either separately or in any desired combination without departing from the present teachings.

An aspect of the invention is a method of modifying recorded material within a camera device in response to simple touch inputs from the user.

Another aspect of the invention is a camera device configured for identification (segmentation) of elements (objects) within the recorded image material.

Another aspect of the invention is a camera device configured for selecting one or more of the identified elements in response to a user touch screen input.

Another aspect of the invention is a camera device configured for modifying selected image material automatically in response to comparing characteristics of these selected screen elements in relation to the image and a set of guidelines, or in response to direct user input, or as a combination of automatic modification and user directed modification.

Another aspect of the invention is a camera device configured for performing image/video modifications of selected material elements, including: deletion, replacement, color change, color saturation, exposure, brightness, noise reduction, blur or sharpen, special effects, positioning, sizing, and so forth.

Another aspect of the invention is a camera device configured for automatically performing blending or image smoothing of adjacent media in response to image/video modifications of selected elements.

Another aspect of the invention is a camera device configured for performing modifications of characteristics of selected elements of the material, including: deletion, color changes, brightness, color saturation, exposure, brightness, noise reduction, blur or sharpen, special effects, positioning, resolution, sizing, and so forth.

Another aspect of the invention is a camera device configured for automatically selecting which object adjustment actions to perform, or automatically proposing object adjustment actions to be performed, for the element selected on the touch screen.

Another aspect of the invention is a camera device configured for automatically selecting or proposing object adjustment action in response to device, or use adjustment history, or stored adjustment profiles.

Another aspect of the invention is a camera device configured for automatically ranking actions which can be performed for the element selected on the touch screen, in response to the camera determining the most likely adjustment options.

Another aspect of the invention is a camera device configured for automatically selecting actions to be performed on the element or characteristic in response to the type of touch action which is received from the user.

Another aspect of the invention is a camera device configured for automatically or user touch input for adjusting picture orientation, such as correcting a horizon.

Another aspect of the invention is a camera device having at least one computer processor (e.g., microcontroller, microprocessor, DSP, processor within an ASIC and so forth) and memory configured for executing programming which includes user interface, display and image processing functions.

Another aspect of the invention is a method of modifying captured images and videos which can be implemented in a wide range of still cameras, video cameras, and combination still-video capture devices which include a touch-sensitive screen.

Another aspect of the invention is a camera device configured for capturing images at a higher resolution than the selected storage resolution, thereby making the high resolution available during the editing process.

Another aspect of the invention is a camera device configured for storing temporal shadow images which can be utilized as additional material and information for improving object selection as well as deletion, modification, or enhancement of the scene portions associated with the selected object.

Another aspect of the invention is a camera device configured for storing displacement shadow images which can be utilized as additional material and information for improving object selection as well as deletion, modification, or enhancement of the scene portions associated with the selected object.

Still further aspects of the invention comprise the ability to incorporate the described methods within any still and/or video camera device having a touch screen, preferably the features being implemented as programming stored in memory (or in an accessible media, or a media that can be loaded into memory) and executed by at least one computer device within the camera which captures, processes and displays image material.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
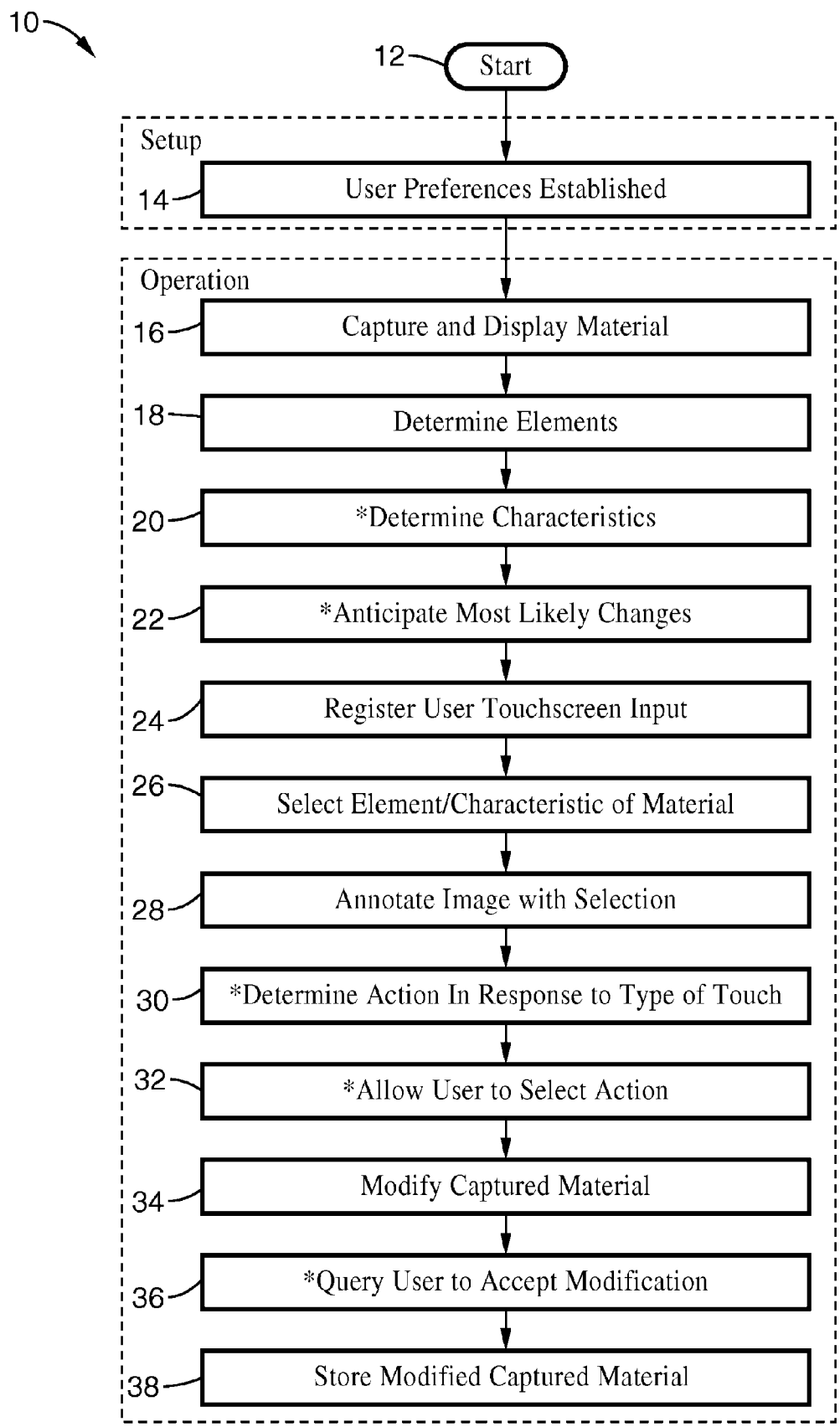
FIG. 1 is a flowchart of modifying recorded material within a camera device in response to touch inputs according to an embodiment of the present invention, showing required as well as selected optional steps of the process.

Referring more specifically to the drawings, for illustrative purposes the present invention is embodied in the apparatus generally shown in FIG. 1 through FIG. 3D. It will be appreciated that the apparatus may vary as to configuration and as to details of the parts, and that the method may vary as to the specific steps and sequence, without departing from the basic concepts as disclosed herein.

The present invention is an apparatus and method which enables a user of an image capturing device to interactively apply in-camera adjustments and enhancements to specific elements within a captured image. Elements within the image are those which can be considered to comprise an item, such as a bird, car, tree, cloud, moon, person, animal, memory stick, MP3 player, computer, and so forth as discerned from the background. Selection of an element is not to be confused with the ability to select a region of the display, such as by moving a box, wherein the captured image is treated as a single background layer. In the present invention, objects with very irregular shapes can be selected for modification, deletion and enhancement without altering elements which are geometrically nearby, but not of the object selected. The method may be implemented on any digital image capture device, including still cameras, video cameras, handy-cams, camcorders, cell-phones incorporating a camera, and the like.

For the sake of simplicity of description, details are not provided herein for performing image processing steps which are known to those of ordinary skill in the art. For example, the processing of images with regard to color, intensity, resolution, image effects and so forth as well as options for cropping and the like are known in the art. The present invention generally provides a mechanism for accessing, selecting and applying these various techniques within the confines of a still or video camera system to provide a number of benefits over conventional camera systems.

Operation according to the invention allows the user to select the image of an object shown on the touch screen and then to edit that object in response to different camera control settings. The in-camera programming is configured to ascertain an object boundary for enhancement based on touch-input selection by the user. Once selected, the user can apply a desired modification or enhancement. Alternatively, in one mode of the invention, the in-camera programming automatically predicts one or more enhancements to be made based on the properties of the selected area and can automatically perform selection and/or both selection and application of the image enhancement. In this mode, programming within the camera performs the desired adjustments while appropriately blending the corrected part of the image with the uncorrected part of the image. Undesired portions of the image can also be predicted, or user selected, wherein these may be removed automatically or as directed by the user.

The camera apparatus and the touch screen image adjustment method of the present invention provide a number of benefits. A fast, simple and efficient means of user interaction is provided so that in-camera adjustments can be made to modify selected portions of the captured material (still images or video). The extent of the area to be modified is not fixed by a region, or box within which changes are applied, but in at least one mode of the invention an element is selected, based on characteristics which define the extent of that element, as determined automatically, or with aid from the user. Utilizing this approach, additional adjustment flexibility is provided so as to achieve significantly improved results. By way of example and not limitation, a user may elect to change the lighting (e.g., brighten/darken) or colors (e.g., range, shift, intensity and so forth) on certain selected areas of the scene(s) only, as opposed to applying the adjustments globally to all parts of the scene as is the conventional camera-based practice.

The present method and apparatus, is also configured with means of separating areas of interest within the scene. For example separating foreground elements from background elements, detecting elements which the user may want deleted or modified and so forth. Segmentation modes of the invention include fully automatic segmentation and user-assisted segmentation. As fully-automatic segmentation methods are more difficult to implement, preferred implementations of the invention may provide segmentation in response to user area selections thereby achieving better segmentation results with less processing.

Conventional methods for performing in-camera adjustments rely on two typical techniques. First is the use of global adjustments, in which transformations are applied similarly to all pixels in the image, such as exposure correction, contrast correction, white balance (color correcting unwanted illumination cast), and so forth. Secondly, some systems provide for limited spatial transformations, such as compression of high dynamic range which can be achieved using automatic selection of region to be adjusted.

In contrast to conventional systems the invention provides a method for the user of an imaging device to interactively adjust with a single touch an area in the scene displayed on the screen.

FIG. 1 illustrates an embodiment 10 of the inventive method shown by way of example and not limitation. The camera apparatus starts operating as per block 12, such as beginning to execute programming on a control processor within the camera device. In block 14 user preferences are established, such as the user selecting operating modes and settings. Block 16 represents material being captured according to user preferences and displayed on an output screen. It will be appreciated that according to at least one implementation of the invention, material for augmentary capture modes, such as shadow framing, are also considered to be collected within block 16. Captured material is displayed to allow the user to review the image on the touch-screen of the imaging device (digital camera or camcorder) and make changes according to the present invention. In block 18 programming preferably analyzes the captured material to fully or partially determine elements within the material (e.g., position, extent, boundaries, characteristics), and optionally in block 20 to ascertain characteristics of the scene and to anticipate any adjustments which the user will most likely want to make as per block 22.

User interaction with the touch screen (e.g. user finger pressure or finger proximity) is registered in block 24 on an area of interest on the touch-screen to which is desired to apply modifications or enhancements. The system of the present invention provide a mechanism for adjusting objects within the captured image material as shown on the touch sensitive display screen, such as in response to one-finger interaction.

In response to the above steps, the in-camera programming automatically computes the boundary at block 26 for the selection indicated by the user based on the position chosen by the user on-screen and preferably annotates the image accordingly as per block 28, such as displaying a highlighting halo about the object. It will be appreciated that in select modes of the invention, the image action is performed without the need of first highlighting the selection, for example in the case of simple deletions. In addition, within blocks 24, 26 and 28 the user can input additional selection criterion and/or correct or refine the selection.

Furthermore, in one implementation or mode, in-camera programming begins determining selection boundaries immediately upon the user first touching the screen. In response to continued contact, such as in response to persistence of contact, or in response to the moving their finger on the touch-screen, the in-camera programming can further refine the selection as to extent and object selection based not only on the current position of the finger on the touch screen but also with respect to the previous positions. In one mode, in response to user selection contact (or proximity) being maintained the programming refines object selection, for example growing the selection until touch screen contact is released. As the selection is refined, element highlighting (e.g., any form of visually identifying boundaries of the element) is updated to provide proper user feedback. In another example finger motion of the continued contact or additional contact are used to refine selection within multiple items. Consider the case of two overlapping elements A and B, as the user touches the screen one or both A and B may be selected, while in response to finger movements pointing toward either A or B, or further refining their positioning by touch, the proper element is selected as element A, or element B. In one mode, the user may virtually "draw" the outline of the desired object on the touch screen to the extent necessary for the desired object to the selected on the display.

In one mode of the invention, the programming is configured for detecting the presence of finger-moving gestures within the user input. These finger-moving gestures have a special significance in selecting objects and/or operations to be performed on those objects. By way of example, one such touch gesture is touch-dragging of a selected object out of the touch screen area and thus removing the object from the scene. Annunciation of object selection is preferably performed during touch dragging before the object is slid from the screen, thus eliminating selection mistakes. By way of another example, in one mode of the invention the detection of short finger moves in a first direction (e.g., left) cause the programming to decrease brightness for the object, while detection of a short finger move in an opposing direction (e.g., right) causes the programming to increase brightness on the selected area. In this context contrast changes can be performed in response to registering up and down finger-movements.

It will be appreciated that the intent of the registered finger-movement is in response to both pattern and speed, as well as optionally pressure for those touch screens so equipped. For example, when a user is tracing the boundary of a screen element their movements are slower and follow a pattern at an object boundary, in contrast to which touch gestures are performed in a rapid manner and would not generally correspond with object boundaries; wherein the programming in at least one mode discerns between these different types of touches to provide a wider breadth of touch-screen choices which can be accessed without the need of a menu or other selection mechanisms. It will also be appreciated that finger gesturing can be as arbitrarily complex to provide any desired number of functions. For instance finger patterns can comprise geometric pattern (e.g., half-circle, circle, square, triangle, etc.), symbols (e.g., check mark, question mark, simple arrow with any shaped terminator, caret, etc.), letters, predetermined patterns, user programmed patterns, and combinations thereof.

In another mode of the invention the finger-motions (e.g., right, left, up and down) movements can direct the vertical and horizontal sizing of the image, such as for narrowing the width of a person in the image without changing other elements in the image. Further examples include detecting motion in other directions (e.g., up, down, diagonals, circle, angles, and so forth) for commanding the programming to perform other changes on the selected area, such as increasing or decreasing contrast, controlling color balance and hue, applying effects including blurring, sharpen, noise, texture, distort and so forth. By way of another example the apparatus is configured according to one mode such that rotational finger movement on the touch screen on a selected item performs resizing of the display, for instance programming enlarges the display for clockwise rotation, or shrinks the display for counter-clockwise rotation. The use of resizing allows the user to edit the portion of the screen with sufficient resolution and to return back to the original sizing afterward. In another mode, rotation can be utilized for controlling the magnification of an element on the screen in relation to other elements being displayed. It will be appreciated that any form of image processing can be applied by the programming in response to detection of these inputs.

As depicted in block 30, the action to be performed is determined by the programming in response to the type of touch contact, or alternatively the type of touch contact in combination with the characteristics of the selected element. The action to be performed may comprise either refining the selection or actually initiating the changes to the selected object. In one mode, selection (segmentation) of image elements is refined in response to continued contact, such as enlarging (or alternatively shrinking) the selection in response to retaining touch contact on the selected element. In at least one mode, the image editing action is selected by the programming in response to the type of touch input (e.g., pattern of motion and contact) registered and can be utilized in combination with any characteristics of the selected element. In one mode of the invention, the programming automatically determines, in response to characterizing (e.g., color, brightness, contrast, hue) one or more actions which are likely to be performed for the image element based on the relation of the selected area to the rest of the content in the scene. For instance, in one mode of the invention, if a dark or shadowy area is pointed to by the user, then the in-camera programming is configured to automatically choose to brighten (increase exposure within) the selected area. In this mode the continued touch input can be utilized by the programming to determine which action should be performed from those available.

The selection of what may be done with the image object are preferably determined in response to size, position, and other characteristics of the element in comparison with the rest of the image and a set of guidelines stored in the camera. For example, small elements about the periphery of a scene are likely candidates for being deleted, blurred, or otherwise being diminished visually. Central elements of the picture are more likely to be subject to enhancements performed, for instance in response to different lighting, colors and shading. The guidelines used in the automatic adjustment, or proposal of adjustment, may comprise predetermined settings, adjustment history (e.g., user or camera), and/or stored adjustment profiles (e.g., from user, a website, and so forth).

In one mode of the present invention, rotation is one of the actions that can be performed on individual elements or upon the entire screen capture. Obviously rotation of a single element within the image requires some filling to be performed in the background of the object, similar to that required when deleting elements. In addition, the entire screen capture can be rotated a desired amount, such as for correcting a skewed horizon, according to another aspect of the invention. In the case of the entire image, the specific element may be considered to have been scaled up to select the entire image which is to be rotated at an arbitrary angle. In one mode, when the camera is set to store images with fewer pixels than can be obtained from the imaging device, the camera retains at least a portion of the bordering pixels (e.g., a full resolution image) until the user completes touch control image manipulation, wherein the resultant image is in essence taking a slightly different group of pixels (skewed) from the larger available image. It will be appreciated that the amount of bordering pixels available can limit the extent of rotating the image without reducing image size, whereby one mode of the invention warns the user when the image size must be reduced in response to rotation of the entire image. Maintaining and utilizing the bordering pixels during rotation allows performing the rotation in many cases without the need to reduce image size or attempting to perform complex in-painting about all corners of the image.

In one mode of a rotation action, the user selects a rotation mode in response to sliding their finger in a circular pattern on the screen (or over the screen) after making initial contact (or sufficient proximity in non-contact sensing). It will be appreciated that when the camera is in a mode in which continued contact persistence changes element selection refinement, then a rotation gesture can be input at any level of selection, from rotating single elements on up to rotation of the entire screen.

In one mode, the rotation action can be automatically determined by the programming in response to detecting a horizon skew (e.g., the horizon not being horizontal across the frame), and in one mode it may be automatically executed, or alternatively executed in response to user selection or acceptance as with other image manipulations described herein.

In one mode of the invention, the user selects horizon rotation by sliding a finger along the horizon in order to select that element, wherein the programming determines the horizon adjustment action is selected and performs rotation of the image thereby as the user then makes a turn from sliding along the horizon into an arc (e.g., resultant pattern shaped like a sideways "J").

Although the system can automatically determine certain aspects for which change may be performed, it can also propose adjustments which the user can accept or deny, or allow the user to select one of a number of possible adjustments. In one implementation, the user is optionally presented with choices in block 32 as to what modification or enhancement are to be performed. These user selected options can be controlled through non-touch screen interface elements (e.g., buttons and knobs) or utilizing an overlay on the touch screen for containing the user-selectable options. By way of example and not limitation, the options for adjustments or enhancement can be one of or a combination of the following: (a) increase or decrease saturation in selected area; (b) adjust white balance in selected area; (c) increase or decrease exposure in selected area; (d) perform noise reduction in selected area; (e) sharpen or blur selected area; (f) remove selected area from image; (g) remove selected area with the option of replacing it with texture gathered from another part of the scene; and other image processing functions which can be performed on the selected image portion.

Modifications and/or enhancements are performed in block 34, preferably in response to programming performing the selected image adjustments and appropriately blending the corrected part of the scene with the uncorrected part of the scene. The modifications can take place immediately, with the only user recourse being to undo the change at any later time, or within a limited period of time, such as while camera power is still on and sufficient memory exists. In one mode of the invention, the programming in block 36 can optionally query the user to accept the modification, or series of modifications. The modification of the stored material is stored as per block 38. It will be appreciated that as modifications are being made the programming preferably stores all necessary information about the sequence of changes performed, wherein the modified material may be restored to its original form. In one mode the undo function is only available for a limited period, such as during editing of a single photo, or as selected by the user. Alternatively, in another mode the user can elect to store both the original and modified images.

Figure 2:
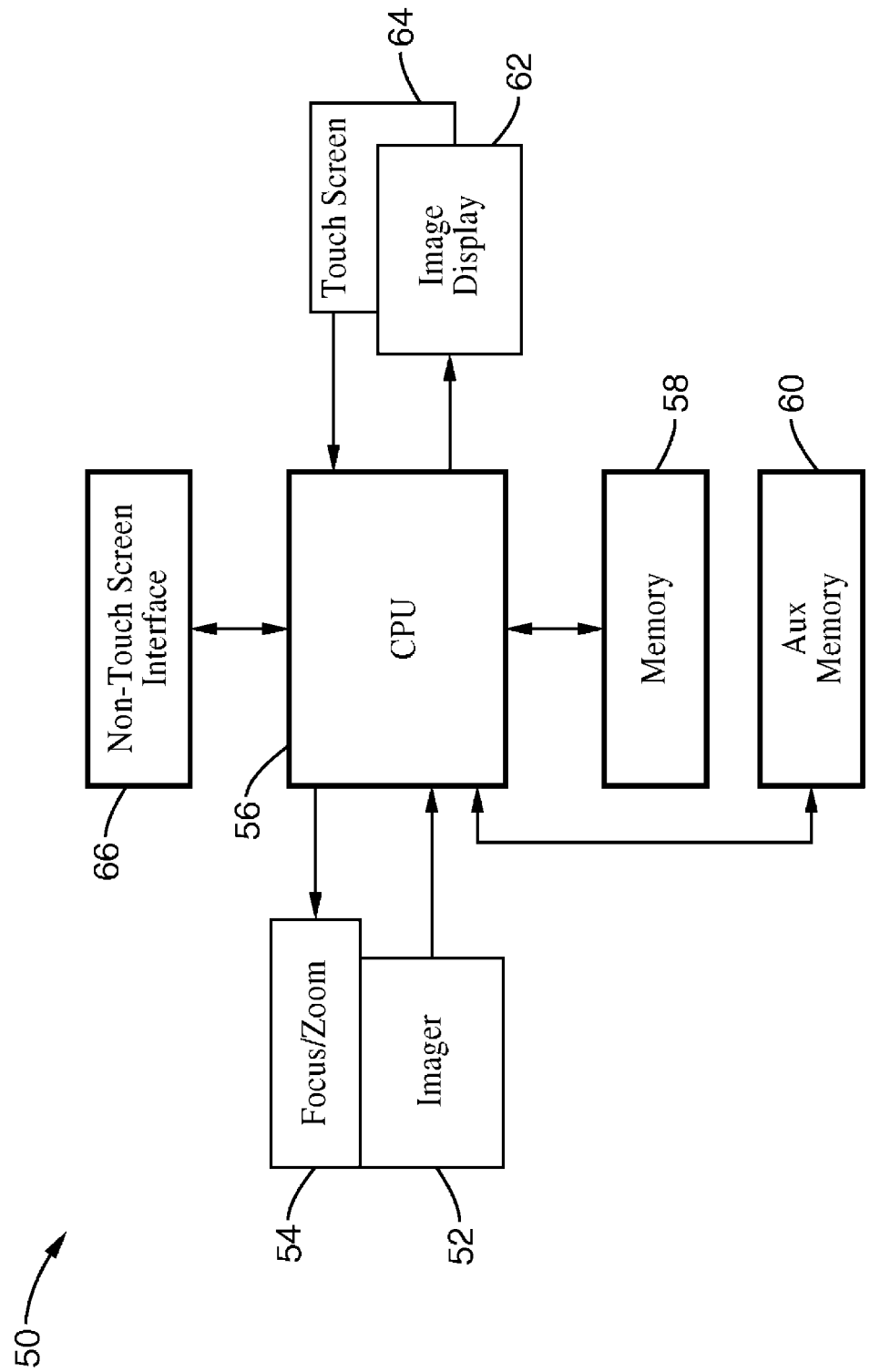
FIG. 2 is a block diagram of a camera apparatus for performing the modification (adjustment) of recorded image material according to an embodiment of the present invention, showing a computer and memory within the apparatus.

FIG. 2 illustrates an embodiment 50 of a camera apparatus configured with an imager 52 and controlled optics 54, such as focusing and zoom controls and other optional imaging elements as desired, which are processed by a CPU, or controller, 56 having memory 58 and auxiliary memory 60 (e.g., memory stick), within which content can be stored and from which programming is executed for performing the inventive aspects described herein. A display screen 62 is shown upon which the captured material (video and/or images) can be displayed. Coupled to display screen 62 is a touch screen 64 which registers user touch in response to the display of images as well as in response to overlaying menus and other control input selections. Camera apparatus 50 is also shown with a non-touch screen interface representing user input and output which is not associated with the touch screen, such as the power button, record button, menu control, cursor buttons, selection wheels, display outputs and other conventional camera controls.

It will be appreciated that aspects of the present invention are implemented for execution within apparatus 50, such as in response to programming resident in memory 58 which is executable on CPU 56. In addition, it will be appreciated that aspects of the present invention can be implemented as programming stored on a media, wherein said media can be accessed for execution by CPU 56.

Figure 3B:
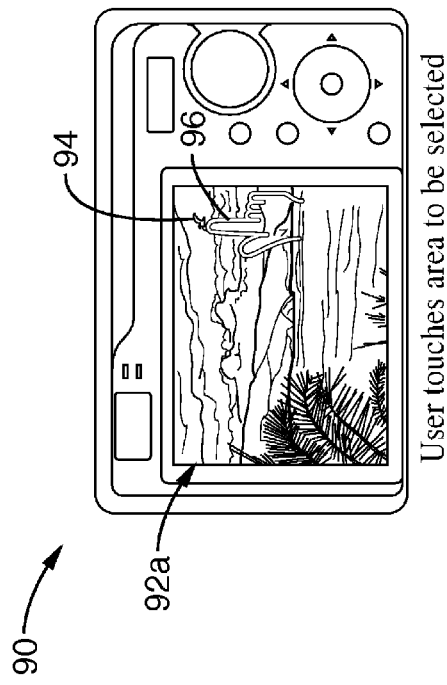
FIG. 3A-3D is an operational sequence of a camera with touch-screen viewfinder interface on which an aspect of the present invention is illustrated.
Figure 3A:
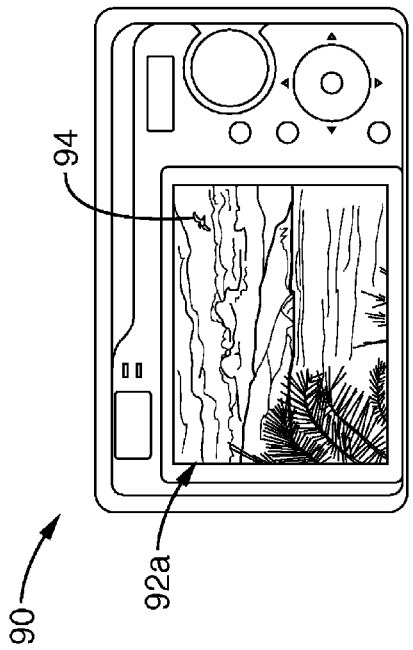
Figure 3D:
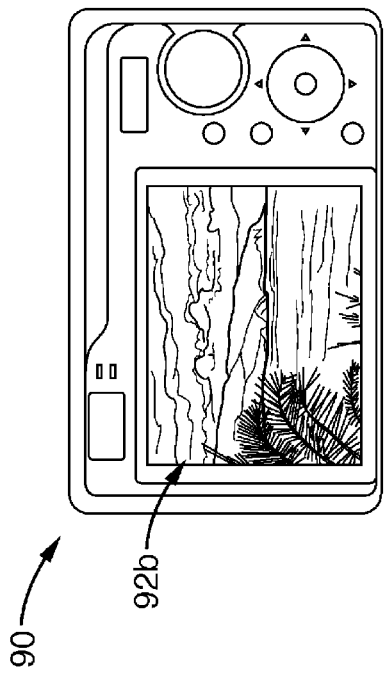
Figure 3C:
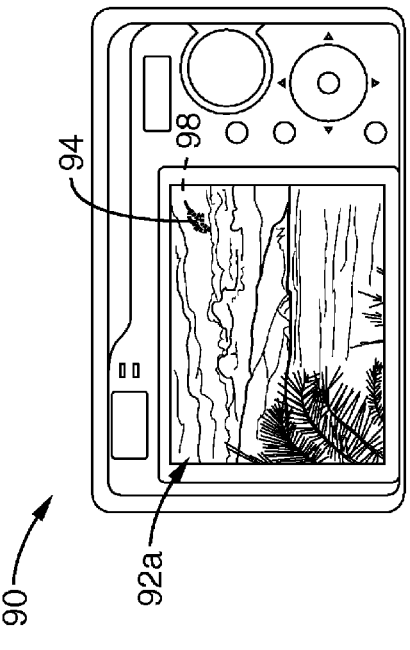

FIG. 3A-3D illustrate an example embodiment 90 of touch screen image modification and/or enhancement according to the invention. Due to the limitation of representation and for simplicity, the example illustrates operation of a camera taking still images, although video image processing would appear similarly. Image material 92a is captured in FIG. 3A, one element (object) of which is a gull 94. In FIG. 3B user touches the touch-sensitive screen upon which image 92a is displayed, wherein touch 96 is registered by the camera at the location of gull 94. In FIG. 3C in response to the user touch input and characteristics of the image in the area of gull 94, the extent of the gull object 94 is determined, selected, and highlighted 98 by in-camera programming, such as with a contrasting contour or halo. In FIG. 3D the modification is completed by the programming which fills in the area of gull 94 toward making it appear in image 92b that it never had been captured within the image. It will be appreciated that the present invention can utilize patterns and colors from the original image in performing the filling in (in-painting) of the deleted image element, or it may utilize additional information such as preprogrammed information (e.g., guidelines, correction tables, and so forth), or in response to additional information available within the camera system as described in the following section.

Numerous modes and options of the present apparatus and method provide increased levels of information to improve the ability or resultant quality of the desired modifications and enhancements to the captured material. Each of the following may be considered a tool, which may be used for a single shot, in response to image characteristics of a shot, utilized for all shots, or utilized in response to user selected settings. The following tools may be considered separately or in various combination with one another and the aspects of the invention recited above.

High resolution editing is a tool according to one implementation of the invention in which material is captured at a higher resolution than the resolution at which it is set to be stored. This higher resolution is retained, preferably until the user has been given a sufficient opportunity to edit the material, whereafter the image is converted to the desired resolution. "Sufficient opportunity" may comprise, for example, a period of time which extends as long as power is retained, while sufficient memory remains, until subsequent materials are edited, until the user inputs a direction to flush the additional material, and similar situations and combinations thereof. In high resolution editing, the additional resolution is made available to the object selective editing process which can provide more beneficial results. During editing, the additional resolution can aid in the selection process, editing process, and improve the quality of the final result even as stored at the lower selected resolution.

Consider the following example using high resolution editing, wherein the user selects an object (e.g., a full moon) that they want enlarged in the final image. The extra resolution provided by the high resolution capture is thus available so that even with the enlarged moon, the edited material after being scaled back down to the desired resolution level is subject to less aliasing and jaggedness as would arise had the moon been enlarged at the desired storage resolution. The user may also want the image resized after making selections, such as after selecting one or more elements to be stored while deleting all or portions of the background, in which case the stored image is provided at a higher quality. The extra bit density is also beneficially utilized in one mode of the invention for improved texture fills and effects based on adjacent areas and so forth. For complex image storage formats (supporting different resolutions in the same image or frame), the additional resolution can be utilized for allowing the user to select portions of the image where higher resolutions are desired, such as around faces in a portrait.

Temporal shadow framing is a tool according to one implementation of the invention in which at least one additional image is captured prior to or following the capture of a selected image, thus a main image is captured with at least one associated temporally displaced shadow image. Temporal shadow framing is preferably performed automatically, in response to the camera setting, operating conditions, user input or combination thereof. The additional image (or frames) 'shadow' the one captured, in that these are not images in their own right, (e.g., preferably not as readily accessible) but are used for collecting additional data for the editing process. One type of information which may be utilized from the shadow image are about motion; including determining which elements in the background are moving (e.g., from computing motion vectors) which simplifies object selection. In addition, specific information about the background over which the moving objects are traversing is obtained.

This shadow image process can also be utilized for images collected within conventional burst sequences or video sequences. A camera can be set for taking a programmed number of shots in a sequence, such as for action shots, and/or continuously collecting shots as long as the shutter control is pressed. In this case during the editing process the programming can use the information from anywhere in the image sequence and provides mechanisms that in response to detecting sufficient difference between the shadow images, the user can select that which provides the most preferred results from the edit process, such as in response to the in-painting of an area from which an element has been removed. Obviously, video frames can be handled in a similar manner to bursts of still images.

By way of example and not limitation on the use of temporal shadow framing, consider an action portrait of a friend captured against a background of colorful convoluted clouds. However, a jet was passing through the scene when the image was captured. Since the temporal shadow image is temporally displaced (across the axis of time), the jet is in a different position, wherein additional background information is therefore available from this image for replacing the image of the jet with the exact orange cloud section, wherein the section need not be estimated or otherwise fabricated. This mechanism provides a means of enhancing techniques described above for replacing objects in the captured material. It will be appreciated that the temporally shifted data can be utilized for performing a number of different modification and enhancements. In one mode of shadow framing, slightly different flash, lens or camera settings are utilized for the shadow image, thus increasing the breadth of material available for image enhancement. In one mode of the invention one or more shadow frames can be captured at lower resolution than the main image. The use of temporal shadow framing also enhances the ability of the camera system to select objects within the scene because image vectors can be determined in response to the additional image information wherefrom objects in the scene can be more readily discerned for making selections.

On a still camera for instance, one or more additional images can be gathered prior to, or after, the shutter sequence for the captured image. These extra images are preferably captured without an audible camera annunciation (e.g., simulated shutter sound), and may be retained for only a limited period of time, as desired, if they are not needed for enhancing the image that they are shadowing. Often, a conventional red-eye feature provides a pre-flash when flash is being utilized, wherein according to a mode of the present invention one or more shadow images is captured during this pre-flash lighting sequence. The collection of the shadow image(s) aids in both selecting red-eye elements in the scene for further correction, while allowing other elements of the scene to be utilized in making modifications and enhancements of the main image.

On video cameras, the preceding or subsequent frames can be utilized for the shadow image, and/or additional shadow frames may be collected such as between the other frames (e.g., distributed equally between frames).

Displacement shadow framing is a tool according to one implementation of the invention of the present invention, which provides shadow frames which are spatially displaced (e.g., side-to-side, or distance subject) from the main image of interest. Since the user is typically in control of camera positioning, displacement shadow framing is performed only at the behest of, or at least participation of the user. For example, a user taking a portrait would capture the main image before or after moving a little (e.g., one to four feet, depending on distance to subject) to one side or the other and capturing a displacement shadow framed image. Obviously, this feature is more user intrusive, yet again more details are made available from which the main picture, or a selected element therein, can be enhanced or modified during adjustment. It will also be appreciated, that the information collected from temporal and/or displacement shadow techniques can be processed within the camera according to super-resolution techniques to increase the resolution of the main photo or portions thereof.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of selectively applying editing adjustments to elements contained within stored image material previously captured by a camera having touch screen input, comprising:
    performing registration of user touch screen input at a location on a display screen at which a specific element in the captured image material is displayed as an image of an object;
    determining boundaries, automatically, for multiple elements as images of objects of arbitrary shape contained within the captured image;
    selecting a specific element as the image of an object within the captured image in response to registration of user touch screen input and the automatically determined boundaries, wherein the specific element as the image of an object is of arbitrary shape;
    performing automatic selecting of an image editing adjustment, or proposing of an adjustment, to said specific element as the image of an object in response to characterizing image aspects therein; and
    processing the image using image processing of said specific element as the image of an object to apply adjustments to the stored image content of said element in relation to the remainder of the captured image to apply a modification of the image content of the image of said object.

2. A method as recited in claim 1, wherein said captured image material comprises a still image or video sequence.

3. A method as recited in claim 1, wherein said determining boundaries for multiple elements contained within the captured image is performed prior to registration of user touch screen input directed at one of those multiple elements.

4. A method as recited in claim 1, wherein said adjustments to said element within said image material are selected from the group of image adjustments consisting of: sizing, brightness, contrast, saturation, white balance, noise reduction, sharpening, blurring, rotation and deleting.

5. A method as recited in claim 1, further comprising refining said selecting of the specific element in response to registering continued touch screen input.

6. A method as recited in claim 1, further comprising entering finger-moving gestures after selection of said specific element to control editing of the specific element within the captured image material.

7. A method as recited in claim 6, wherein the brightness and contrast of the element within the image material is changed in response to said finger-moving gestures comprising right, left, up and down finger sliding.

8. A method as recited in claim 1, further comprising resizing the display for the selected element in response to finger moving gestures.

9. A method as recited in claim 8, wherein said resizing is performed in response to a circular finger sliding.

10. A method as recited in claim 1, further comprising generating a visual indication that the specific element has been selected.

11. A method as recited in claim 10, wherein said visual indication comprises a highlight surrounding said element within the captured image material.

12. A method as recited in claim 1, further comprising:
    capturing and applying adjustments to the image material at a first image resolution; and
    storing the image, after the completion of image adjustment processing, at a second image resolution which is equal to or less than said first image resolution;
    wherein said second image resolution is user selectable.

13. A method as recited in claim 1, further comprising:
    capturing additional image material which is temporally, or spatially separate from the capture of said image material; and
    applying adjustments to said image material in response to said additional image material.

14. A method as recited in claim 13, further comprising storing said image material after the completion of image adjustment processing, without storing the associated additional image material.

15. A method of selectively applying editing adjustments to elements contained within stored image material previously captured by a camera having touch screen input, comprising:
    capturing image material comprising a still image or video sequence;
    performing registration of user touch screen input at a location on a display screen at which a specific element in the captured image material is displayed as an image of an object;
    determining boundaries, automatically, for elements of an arbitrary shape as an image of an object within the captured image material;
    selecting a specific element as the image of an object within the captured image in response to registration of user touch screen input on that object and the automatically determined boundaries, wherein the specific element as the image of an object is of arbitrary shape;
    performing automatic selecting of an image editing adjustment, or proposing of an image editing adjustment, to said specific element as the image of an object in response to characterizing image aspects therein;
    wherein said adjustment is selected from the group of adjustments consisting of sizing, brightness, contrast, saturation, white balance, noise reduction, sharpening, blurring, rotation and deleting;
    generating a highlight surrounding said specific element to indicate the selection of said specific element;
    refining said selecting of the specific element in response to registering persistent touch screen input;
    controlling the application of adjustments to said specific element of the captured image material in response to registration of additional touch screen input in the form of finger-moving gestures; and
    processing the image using image processing of said specific element to apply adjustments to the content of said element in relation to the remainder of the captured image and thus apply a modification of the image content of the image of said object while appropriately blending the corrected part of the image with the uncorrected part of the image.

16. A method as recited in claim 15, further comprising:
    capturing and applying adjustments to the image material at a first image resolution; and
    storing the image, after the completion of image adjustment processing, at a second image resolution which is equal to or less than said first image resolution;
    wherein said second image resolution is user selectable.

17. A method as recited in claim 15, further comprising:
capturing additional image material which is temporally, or spatially separate from the capture of said image material;
applying adjustments to said image material in response to said additional image material; and
storing said image material after the completion of image adjustment processing, without storing associated additional image material.

18. A camera for selectively applying editing adjustments using touch screen input to elements contained within stored image material previously captured by the camera, comprising:
an optical imager configured for capturing image material;
an optical display for visually displaying captured image material;
a touch screen coupled to said optical display for registering the position of user contact upon the display of said captured image material;
a computer coupled to said optical imager, said optical display and said touch screen for capturing and displaying image content and selectively applying editing adjustments to elements contained within the image material; and
programming executable on said computer for,
performing registration of user touch screen input at a location on a display screen at which a specific element as an image of an object in the captured image material is displayed,
determining boundaries, automatically, for elements in the captured image which are of arbitrary shape,
selecting a specific element as the image of an object within the captured image in response to registration of user touch screen input and the automatically determined boundaries, wherein the specific element as the image of an object is of any arbitrary shape,
performing automatic selecting of an image editing adjustment, or proposing of an image editing adjustment, to said specific element as the image of an object in response to characterizing image aspects therein,
wherein said adjustment is selected from the group of adjustments consisting of removal, rotation, color changes and/or lighting changes, and
processing the image of said specific element as the image of an object to apply content editing adjustments to the content of said element in relation to the remainder of the captured image to apply a modification of the image content of the image of said object while appropriately blending the corrected part of the image with the uncorrected part of the image.

19. A computer-readable media containing a computer program executable on a computer within a camera configured with a display and associated touch screen for capturing and displaying image content and selectively applying image content editing adjustments to elements contained within stored image material previously captured by the camera, comprising:
performing registration of user touch screen input at a location on a display screen at which a specific element in the captured image material is displayed as an image of an object;
determining boundaries, automatically, for multiple elements as images of objects in the captured image which are of arbitrary shape;
selecting a specific element as the image of an object within the captured image in response to registration of user touch screen input and the automatically determined boundaries, wherein the specific element as the image of an object is of arbitrary shape;
performing automatic selecting of an adjustment, or proposing of an adjustment, to said specific element as the image of an object in response to characterizing image aspects therein; and
wherein said adjustment is selected from the group of adjustments consisting of removal, rotation, color changes and/or lighting changes;
processing the image of said specific element as the image of an object to apply adjustments to the content of said element in relation to the remainder of the captured image to apply a modification of the image content of the image of said object while appropriately blending the corrected part of the image with the uncorrected part of the image.

20. A method of selectively applying editing adjustments to delete elements contained within image material captured by a camera having touch screen input, comprising:
performing registration of user touch screen input at a location on a display screen at which a specific element in the captured image material is displayed as an image of an object;
determining boundaries, automatically, for multiple elements as images of objects of arbitrary shape contained within the captured image;
selecting a specific element as the image of an object within the captured image in response to registration of user touch screen input and the automatically determined boundaries, wherein the specific element as the image of an object is of arbitrary shape;
performing automatic selecting of a deletion adjustment to said specific element as the image of an object in response to characterizing image aspects therein; and
processing the image of said specific element to delete the content of said element in relation to the remainder of the captured image and to appropriately fill or blend the location of the deleted object.

* * * * *